United States Patent [19]
Furst

[11] Patent Number: 5,680,261
[45] Date of Patent: Oct. 21, 1997

[54] WIDE ANGLE LENS APPARATUS FOR VEHICLE REAR WINDOW

[76] Inventor: Peter Furst, Haupstrasse 19, 63927, Bürgstadt, Germany

[21] Appl. No.: 652,242

[22] Filed: May 23, 1996

[30]   Foreign Application Priority Data

May 24, 1995 [DE] Germany ............. 295 08 623 U

[51] Int. Cl.$^6$ ..................................................... G02B 7/02
[52] U.S. Cl. ................. 359/822; 359/813; 359/710; 359/742; 359/743
[58] Field of Search ............................... 359/813, 814, 359/710, 742, 743, 819, 822, 818

[56]   References Cited

U.S. PATENT DOCUMENTS

| | | | |
|---|---|---|---|
| 4,069,812 | 1/1978 | O'Neill | 359/743 |
| 4,385,808 | 5/1983 | Vanderwerf | 359/743 |
| 4,723,075 | 2/1988 | German | 359/813 |
| 4,896,953 | 1/1990 | Cobb, Jr. | 359/710 |

*Primary Examiner*—Loha Ben
*Attorney, Agent, or Firm*—Jacobson, Price, Holman & Stern, PLLC

[57]   ABSTRACT

A wide angle lens for a vehicle rear window is movably held in a guide device which is fixed to the body of the vehicle. The lens can be moved out of the rear view field of vision of the driver for normal forward driving namely, it can be moved along the guide device. The lens is brought into the rearward field of vision only when the vehicle is to be maneuvered in reverse.

9 Claims, 3 Drawing Sheets

WIDE ANGLE LENS APPARATUS FOR VEHICLE REAR WINDOW

FIELD OF THE INVENTION

The invention relates to a wide angle lens apparatus for the rear window of a vehicle.

BACKGROUND OF THE INVENTION

In order to widen a field of view of a driver, for rearward driving, so that the driver can see regions which are located close to the rear of the vehicle, e.g. at or near the rear bumper, it is known to fix a Fresnel lens to the rear window of the vehicle. This extends the area visible to the driver to a distance of about 1 yard from the rear bumper.

However, for normal forward driving the wide angle lens is disposed in the lower part of the driver's rear view field of vision. Thereby it obstructs the otherwise unimpeded view of the traffic behind the vehicle.

Accordingly, the underlying problem of the invention is to eliminate this interference with a clear rear field of view which is needed for normal driving, in that (in normal forward driving) there is no need to be aware of objects and obstructions close behind the vehicle.

SUMMARY OF THE INVENTION

In solving this problem, it is provided according to the invention that a wide angle lens is movably held in a guide apparatus which is fixed to the body of the vehicle. In this way, the lens can be moved out of the rear view field of vision of the driver for normal forward driving; namely, it can be moved along the guide apparatus. The lens is brought into the rearward field of vision only when the vehicle is to be maneuvered in reverse.

According to an advantageous embodiment of the invention, the guide apparatus may extend approximately parallel to the lower edge of the rear window, so that when the wide angle lens is not needed the lens can be moved laterally out of the field of vision, along the guide apparatus.

Alternatively, the guide apparatus may extend downward into the vehicle body, below the field of vision, so that the wide angle lens can be lowered into the vehicle body when the vehicle is to be driven in normal forward driving.

In a second alternative embodiment of the invention, the wide angle lens may be held in mounting means which are swingably or pivotably mounted on the vehicle body, allowing the lens to be swung downward into the vehicle body.

Advantageously, motor means are provided to effect the movement of the wide angle lens, with the lens-moving motor being actuatable by a separate switch on the dashboard of the vehicle, or by an automatic interlock via the central vehicle controls whereby the lens is moved into the driver's field of vision when reverse movement of the vehicle is begun.

BRIEF DESCRIPTION OF THE DRAWINGS

The invention will be described in more detail hereinbelow with reference to the exemplary embodiments illustrated in the accompanying drawings.

DETAILED DESCRIPTION OF THE PREFERRED EMBODIMENTS

Figure 1:
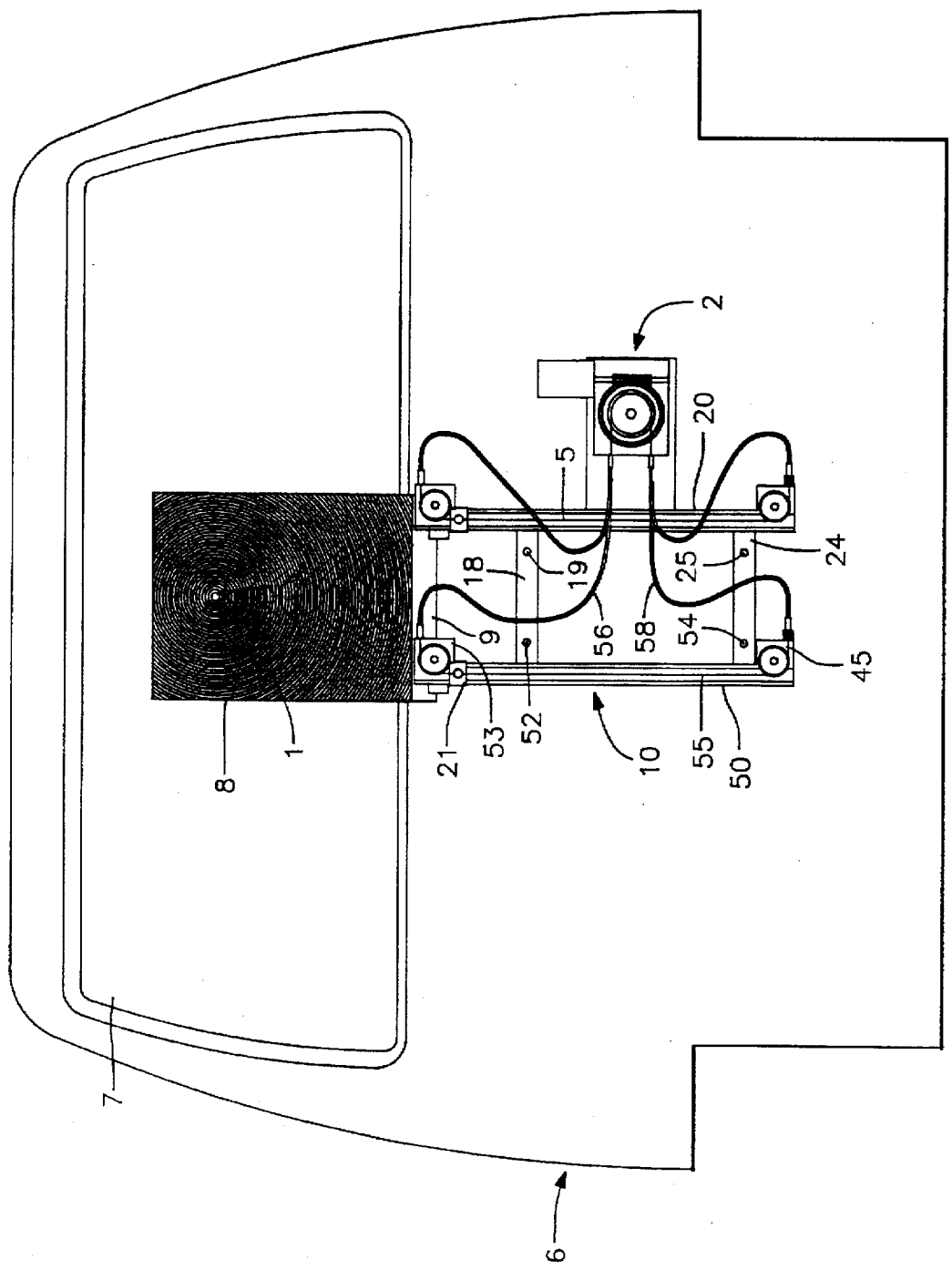
FIG. 1 is a schematic drawing of the rear hatch or rear door of a motor vehicle, bearing the inventive wide angle lens apparatus.

The rear hatch or door 6 of a motor vehicle has a window 7 in its upper part. The driver can see rearwardly through this window, through their internal rear view mirror. The middle region of their field of view through the rear view mirror is designated 8. A Fresnel lens 1, serving as a wide angle lens, is mounted in the middle of region 8. The structure, composition, and properties of the lens are per se known. The material of which the lens is comprised may be, e.g., a transparent acrylic plastic ("acrylic glass"), which is shaped in a known fashion. The lens 1 may be shaped to conform to the curvature of the window 7.

The lower edge of lens 1 is enclosed in concealed fashion in the vehicle, between the exterior skin of the door 6 and an inner covering of the door framework, and is held firmly in a clamping strip 9.

A guide apparatus 10 guidingly holds the lens 1, which apparatus 10 is also enclosed between the outer metal skin of the door 6 and the inner covering of the door framework. Screw means fix the guide apparatus 10 to the skin of the door.

Figure 2:
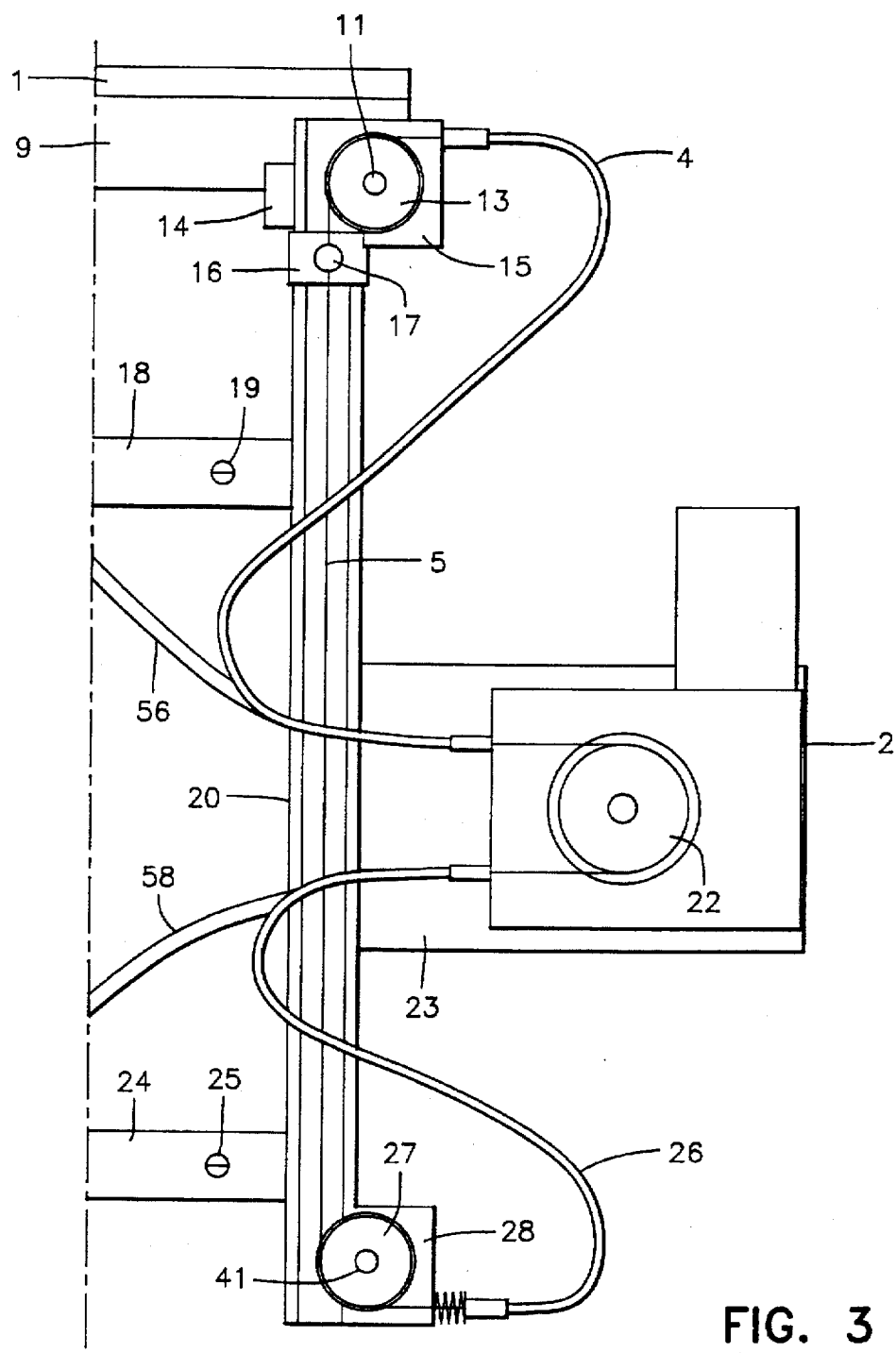
FIG. 2 is a schematic drawing of the drive means for the lens mounted on the rear window.

FIG. 2 illustrates the functioning of the raising and lowering guide mechanism for the lens 1. For simplicity, only the right half of the guide mechanism 10 of FIG. 1 is shown. The left half is essentially the same (exclusive of the drive unit 2).

Two idler pulleys 13, 27 are rotatably mounted on the ends of a vertically disposed profile rail 20, by means of lugs or brackets 15, 28 which are formed on or fixed to the rail 20 and extend perpendicularly to the rail. The pulleys 13, 27 serve to guide a steel cable 5 along the middle of the longitudinal extent of rail 20. The fixed axles 11, 41 of the pulleys extend perpendicularly to the longitudinal axis of the rail 20.

A second steel cable 55 is guided over the central region of the longitudinal extent of a second profile rail 50 (at left in FIG. 1) disposed parallel to rail 20 at a distance therefrom, with the guiding means comprising two additional pulleys disposed at the opposite ends of rail 50; the disposition and axles of these pulleys correspond to those of the pulleys 13 and 27.

The parallel profile rails 20, 50 are connected and stabilized by two crossbars 18, 24. The total guiding apparatus 10 can be mounted to the exterior skin of the vehicle body on hatch or door 6 by means of mounting holes 19, 25, 52, 54 in the crossbars 18, 24.

Figure 3:
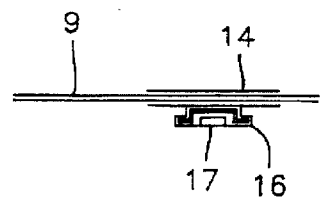
FIG. 3 is a cross section of the mounting means for the wide angle lens.

A sliding piece 16 surrounds rail 20 and can be moved up and down on the rail 20. Clamping means 14 are fixed to slide 16. The clamping strip 9 of the lens 1 is fixed in the jaws or the like of clamping means 14, whereby the lens 1 is held in place (FIG. 3).

Steel cable 5 is fixed to sliding piece 16 via a rivet insert 17 which is pressed into a bore in sliding piece 16. Thus the cable 5 is moved up and down with sliding piece 16.

A flexible cable sleeve 4 surrounds cable 5 between the drive unit 2 and the bracket 15, which sleeve is not movable in its longitudinal direction. One end of sleeve 4 abuts the bracket 15 and the other abuts the housing 37 of the motor drive unit 2. A similar longitudinally immobile sleeve 26 surrounds cable 5 between housing 37 of drive unit 2 and bracket 28, wherewith one end of sleeve 26 abuts housing 37 and the other abuts bracket 28.

A second sliding piece 21 is provided on profile rail 50, which piece 21 is slidable along rail 50 in the same way in which sliding piece 16 is slidable along rail 20. Steel cable 55 is anchored to sliding piece 21. A flexible cable sleeve 56 surrounds cable 55 between the drive housing 37 and a bracket 53 disposed on the upper end of profile rail 50. A second flexible cable sleeve 58 surrounds cable 55 between the drive housing 37 and a lower bracket 45 (corresponding to bracket 28 on rail 20).

The drive unit 2 is comprised of a DC electric motor 31 (FIG. 4) mounted on a plate 23, which motor is powered through lines 39, 40 from the battery 29 of the vehicle (not shown) when the switch 60 is closed. Switch 60 is disposed in the power supply line 39, preferably at a location on the dashboard of the vehicle which is close to the driver.

The DC motor 31 is mounted on the drive housing 37. A worm gear 38 is fixed by key means to the shaft 36 of the motor, which shaft extends into the housing 37. Worm gear 38 engages a pinion 32 mounted on a shaft 35. Pinion 32 is mounted so as to be irrotational with respect to shaft 35. Shaft 35 extends vertically through housing 37 and is rotationally mounted in oppositely disposed bearings 33, 34.

Figure 4:
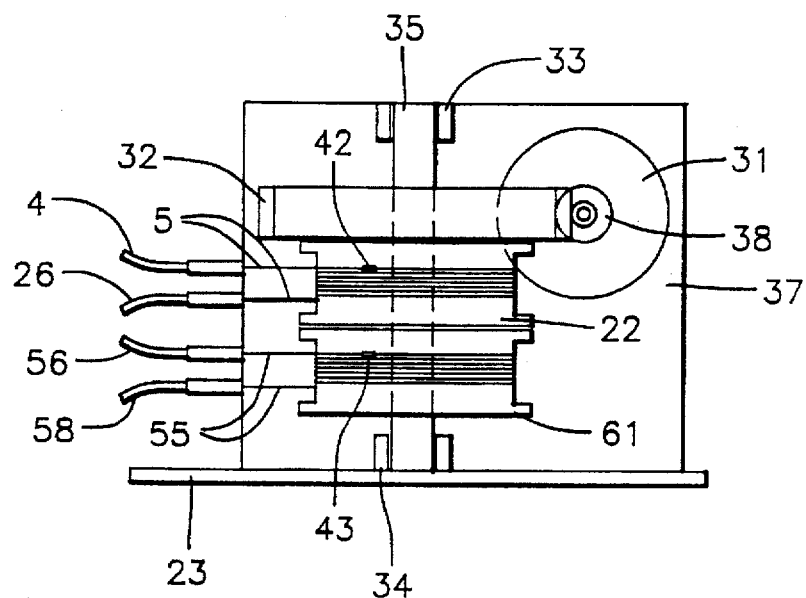
FIG. 4 is a schematic plan view of the motor part of the drive means of FIG. 2.

From topmost down in FIG. 4, the following items are mounted on shaft 35 and are irrotational with respect to the shaft 35: a pinion 32 and two cable pulleys (or drums) 22, 61. When DC motor 31 is operated in a given direction of rotation, the pulleys 61, 22 are thus rotated in mutually the same direction, the direction of rotation of shaft 35; and when motor 31 is operated in the opposite direction of rotation the rotational direction of both pulleys 61, 22 is reversed. When the motor 31 is deactivated, if the lens is in its raised position as shown in FIG. 1 it will be held in the raised position because the pulleys 61, 22 will be held fixed as a result of their being rigidly coupled to the motor.

The steel cable 5 is wound around upper pulley 22. The end of cable 5 is fixed to the flange or hub of pulley 22 (e.g. at the point 42). Similarly, steel cable 55 is wound around pulley 61 and is fixed to the flange or hub of pulley 61 (e.g. at the point 43). The rotation of both pulleys 22, 61 is absolutely synchronous with the rotation of the shaft 35, because they both are fixed to the shaft by key means.

Figure 5:
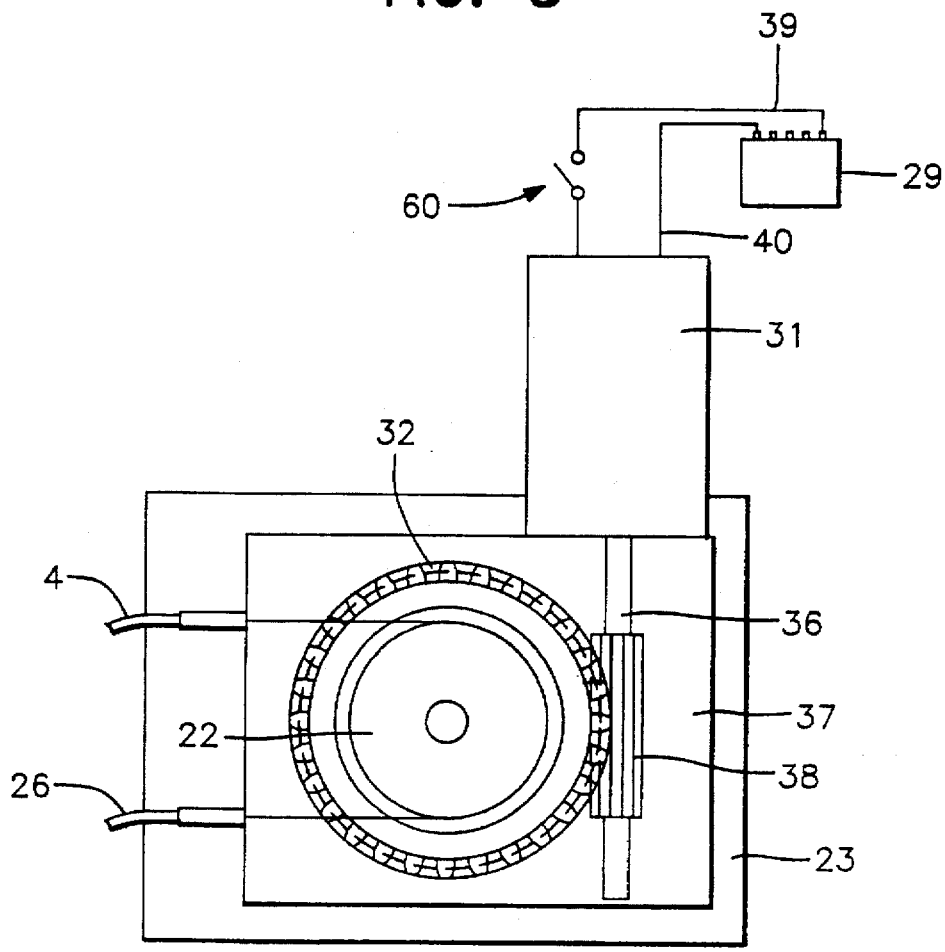
FIG. 5 is a lateral view of the drive means shown in FIG. 4.

When the electric motor 31 is operated so as to drive the cable pulleys 61, 22 in the counterclockwise direction (viewed in the plan view of FIG. 5), steel cable 5 is played out into sleeve 4 and is withdrawn from sleeve 26, whereby the sliding piece 16 is corresponding moved downward along profile rail 20; at the same time, cable 55 is played out into sleeve 56 and is withdrawn from sleeve 58, wherewith sliding piece 21 is moved downward synchronously with piece 16 and to the same height, along profile rail 50.

When DC motor 31 is operated in the opposite direction, steel cable 5 is withdrawn from sleeve 4 and is played out into sleeve 26, and steel cable 55 is withdrawn from sleeve 56 and is played out into sleeve 58, with the result that the two sliding pieces (16 (FIG. 2), 21 (FIG. 1)) are moved synchronously and to the same height, along the respective profile rails 20, 50, whereby the lens 1 which is connected to said pieces 16, 21 is moved upward along the inner side of window 7.

In a variant embodiment which is also within the scope of the invention, only one profile rail 20 is provided, which is mounted horizontally on the vehicle body. Two sliding pieces which are fixed to a Bowden cable can be moved in either lateral direction along the length of the rail. In this case the lens does not move vertically into and out of the visual field 8, but horizontally.

Articulated connections of the lens 1 to the clamping strip 9 may be used instead of rigid connecting means; wherewith the lens 1 can be swung down out of its position according to FIG. 1, and thus out of the visual field 8, and can be swung back up to position the lens for use. As a result, profile rails 20 and 50 may be dispensed with.

I claim:

1. A wide angle lens assembly for a rear window of a vehicle, said wide angle lens assembly comprising:
   a wide angle lens movably held in a guide device to be fixed to a body of the vehicle.

2. A wide angle lens assembly according to claim 1, wherein said guide device extends parallel to a bottom edge of the rear window of the vehicle.

3. A wide angle lens assembly according to claim 1, wherein said guide device extends into the vehicle body, below a field of vision through the rear window.

4. A wide angle lens assembly according to claim 3, wherein said wide angle lens is swingably connected to the vehicle body so that the wide angle lens can be swung downward into the body.

5. A lens according to claim 3, wherein the guide device includes two profile rails disposed on the vehicle body in a concealed fashion and the wide angle lens is movable along said two profile rails.

6. A lens according to claim 5, wherein the wide angle lens is connected to at least one steel cable which is wound around a cable pulley.

7. A lens according to claim 6, wherein the cable pulley is drivable by a motor.

8. A wide angle lens assembly according to claim 1, wherein a drive motor is provided for moving the wide angle lens.

9. A wide angle lens assembly according to claim 8, wherein a drive unit including winding pulleys is provided for moving the wide angle lens.

* * * * *